US009619464B2

(12) United States Patent
Gusakov et al.

(10) Patent No.: US 9,619,464 B2
(45) Date of Patent: Apr. 11, 2017

(54) NETWORKED LANGUAGE TRANSLATION SYSTEM AND METHOD

(71) Applicant: TRANSLATION MANAGEMENT SYSTEMS LTD., Moscow (RU)

(72) Inventors: Vladimir Gusakov, Moscow (RU); Artem Ukrainets, Moscow (RU); Ivan Smolnikov, Moscow (RU)

(73) Assignee: SmartCAT Ltd., Tortola (VG)

( * ) Notice: Subject to any disclaimer, the term of this patent is extended or adjusted under 35 U.S.C. 154(b) by 307 days.

(21) Appl. No.: 14/064,194

(22) Filed: Oct. 28, 2013

(65) Prior Publication Data

US 2015/0120273 A1    Apr. 30, 2015

(51) Int. Cl.
*G06F 17/28*    (2006.01)
(52) U.S. Cl.
CPC ................ *G06F 17/289* (2013.01)

(58) Field of Classification Search
CPC .... G06F 17/2827; G06F 17/289; G06F 17/28; G06F 17/2854; G06F 2221/2101; G06F 11/0766
See application file for complete search history.

(56) References Cited

U.S. PATENT DOCUMENTS

| 2009/0070099 A1* | 3/2009 | Anisimovich | G06F 17/2755 704/5 |
| 2011/0282647 A1* | 11/2011 | Pastore | G06F 17/289 704/4 |
| 2013/0197896 A1* | 8/2013 | Chalabi | G06F 17/2735 704/2 |

\* cited by examiner

*Primary Examiner* — Angela A Armstrong
(74) *Attorney, Agent, or Firm* — Lowenstein Sandler LLP

(57) ABSTRACT

A networked language translation system and method allowing access by a distributed network of human and machine translators that communicate electronically to provide for the translation of material. The system and method provide a way to aggregate the resources of a large number of intermittently available, mixed competency translators, human or machine, in order to provide high-quality translations.

18 Claims, 3 Drawing Sheets

NETWORKED LANGUAGE TRANSLATION SYSTEM AND METHOD

FIELD OF THE INVENTION

The present invention relates to a method and a system for translation of content and more particularly, to a method and a system for collaborative translation.

BACKGROUND

Information gathering and exchange for any scientific, commercial, political or social purpose often requires fast and easy translation of content in order to make the universe of knowledge and ideas useful on a global scale. Computer programs that translate automatically from one language to another ("machine translation programs") can in principle meet this need and such programs have been developed and are in continued development for a variety of languages. For formal (as opposed to informal, idiomatic, colloquial) content in well-studied languages (e.g., English, French, Spanish, German, and others), such machine translation programs work reasonably well.

However, for more-difficult or less-studied languages (e.g., Arabic), existing machine translation programs do not work well, even for formal communications (e.g., Modern Standard Arabic), and they are particularly weak in the case of informal, colloquial, and idiomatic communications. Similarly, where specificity is needed, machine translation by itself is insufficient even for well-studied languages (e.g., English, French, Spanish, German, and others).

Human translators can in principle provide accurate translations for difficult languages and informal communications, but Internet applications require constant availability and quick response, which cannot be assured in the case of existing methods that use human translators.

In light of above discussion, a method and a system is needed that enables the efficient use of a memory database wherein a large team of translators work on content effectively.

SUMMARY OF THE INVENTION

In general, the invention is achieved as follows:

In one aspect, the present invention provides a system and a method for translating the language of a source file. The system comprises of a web server to process data in the source file to be translated and to accept uploads of the source file, a storing database to store the translated content, processed source files and glossary terms, a segmentation module capable of segmenting the source file into a plurality of segments, a processing module to match the segments with the existing data stored in the database storage to get exact and/or fuzzy matches from already translated texts, and a machine translation module to derive a machine translation for the segment, a terminology search module to find terms from the terms database occurring in the source text, and a user interface accessible by multiple users to view the machine translation, exact and fuzzy segment matches and terms found, and to provide the human translation for the source file. The system and method may be provided as computer executable code (e.g. software), hardware or a combination of both.

In another aspect of the present invention, for each segment saved in the database, the processing module searches for an exact or partial match of previously translated sentences, glossary terms and the machine translations of the sentence. In embodiments, the user interface may be accessed by multiple users and the user's translations are transmitted by the user interface to a database. The user interface may also display other users' translations of completely or partially matching segments.

BRIEF DESCRIPTION OF THE DRAWINGS

Embodiments of the invention will hereinafter be described in conjunction with the appended drawings provided to illustrate and not to limit the scope of the invention, wherein like designation denotes like element and in which.

DETAILED DESCRIPTION OF THE INVENTION

Figure 1:
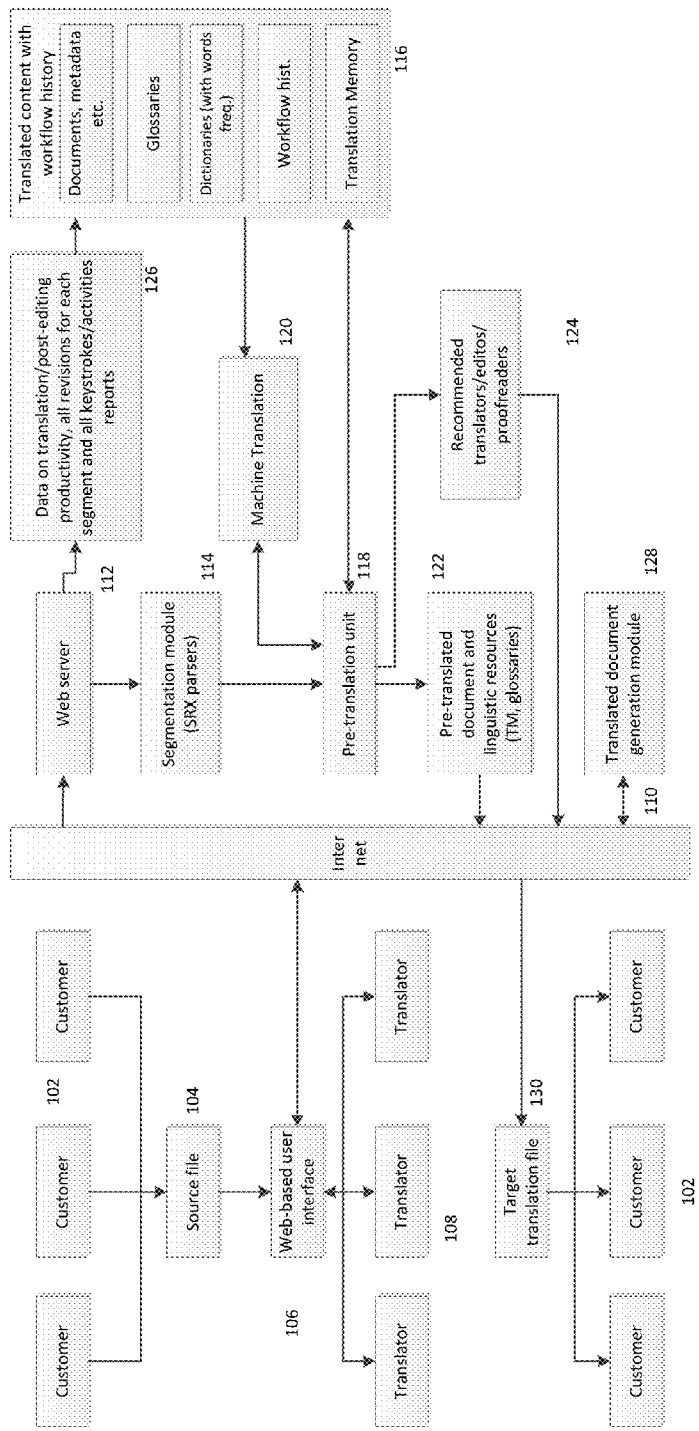
FIG. 1 is a flow diagram illustrating a networked language translation system in accordance with an embodiment of the present invention.

In the following detailed description of embodiments of the invention, numerous specific details are set forth in order to provide a thorough understanding of the embodiments of the invention. However, it will be obvious to a person skilled in art that the embodiments of invention may be practiced with or without these specific details. In other instances well known methods, procedures and components have not been described in detail so as to not unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

The present invention is directed to providing a system and method for fast, effective and more reliable enhanced language translation through a networked language translation system. The networked language translation system is a distributed network of human and machine translators that communicate electronically and produce the translation of texts that are challenging for both existing machine translation methods and traditional human translation workflow, including the translation of rapidly-evolving dialogs and other rapidly electronically produced data.

In embodiments of the present invention, the system is a web-based cloud-type platform wherein the access to the system is provided via a web-browser through a user interface and where the interface may have a separate window for translation project management and a translator working interface for parallel text editing. The networked language translation system provides a way to aggregate the resources of a large number of intermittently available, mixed competency translators, human or machine, in order to provide high-quality translations in a cost-effective and timely manner.

In embodiments of the present invention, translations are produced by breaking an input source text into segments, sending each segment as a translation request to a translator with redundant requests being sent to a plurality of machine translation engines, terminology and translation memory repositories, with each source having a varying level of reputation, match and/or self-confidence metric for each particular segment sent. Then, the results of these translations are assembled taking into account the reputation of each source, the statistical properties of the translation results (available for each segment), the linguistic and other properties of the particular source and target languages, and other relevant factors which may be represented as numerical scores.

The networked language translation system is based on the technology of Translation Memory (TM), a parallel sentences storage and search system (source language-target language) which is used to facilitate translation from one language to another. TM stores translations so that next time it is not necessary to translate the same phrases or sentences again. Thus, one of the main functions of TM involves search and comparison of sentences, phrases and their translations.

FIG. 1 is a block diagram illustrating a networked language translation system in accordance with an exemplary embodiment of the present invention. As shown in FIG. 1, the networked language translation system 100 services a plurality of customers 102 that desire source files 104 to be translated. The plurality of customers 102 are connected to the remote web server 112 through internet 110 with a browser-based user interface 106. The source file 104 is uploaded to a web server 112 through the internet 110. Once a source file 104 is uploaded on the web server 112, a segmentation module 114 processes the source file 104 and breaks the source file 104 text into a plurality of segments. The plurality of segments each having some text of the source file 104 is processed by a basic pre-translation unit 118, which matches each source text segment with linguistic resources 116, i.e. finds exactly matching segments, partially (fuzzy) matching segments, glossary terms found in the segment and associates each segment word with an entry in a frequency dictionary. The linguistic resources 116 consist of frequency dictionary and glossary terms for the language and the database of previously translated segments, with accompanying documents metadata and each segment translation workflow data. Thus the pre-translation unit 118 defines for each found matching segment: document to which it belongs, it's respective translators (MT engines used, human translator, editor, proofreader etc.) and quantitative scores received by these translators if applicable. Based on the pre-defined pre-translation rules (which can be modified for each project) pre-translation unit 118 then creates a pre-translated document/package containing exact and partial translation memory matches, glossary entries and customized machine translation engine's output. These rules are applied for each segment and define which human operations are required for each segment based on the source of the selected segment pre-translation used and its confidence metric.

In embodiments of the present invention, TM (Translation Memory) is a system of storage and search of parallel segments (e.g. sentences, expressions or phrases)—namely: original source—translation. It is used to help the translator translate a text from one language into another. TM accumulates translation results which help avoid translating identical segments (e.g. sentences, expressions or phrases) repeatedly. Thus, one TM function is a search for segments (e.g. sentences, expressions or phrases) and the translations thereof which correlate to the content being translated. A scoring function is used to measure similarity between the fragments of the content and those residing in a database.

A plurality of translators 108 are connected to the system 100 through the web-interface 106. The fragments generated by the segmentation module 114 are sent as a translation request to the pre-translation unit 118, with produces a pre-translated document (which can include a selection on a segment-by-segment level of preferred machine translation output from a plurality of machine translation engines) and a set of recommended human translators/editors/proofreaders with varying levels of reputation and varying preference scores. The web-based user interface 106 includes separate views for project management and translator's working interface for parallel text editing by a plurality of translators/editors/proofreaders/reviewers etc. Using the translator's working interface, the translator 108 can view the translation of the source file 104 created by other translators as well as the translation of a segment produced by a pre-translation unit 118.

Segment translations generated after the pre-translation unit 118 by human translators/editors/proofreaders 108 (different segments can undergo different human operations) are automatically verified after each human operation for compliance with the pre-defined quality assurance rules and customer and project glossaries. Based on these checks each segment can receive a special warning flag displaying for the current text translator his predecessor, worked on this segment, and description of the potential errors found in it. Each translator can correct errors, according to these reports, or can comment them. During the next workflow operation remaining errors and accompanying comment will be visible and can also be corrected. Each segment should pass through all workflow stages defined in the source document, with a possible omission of some stages based on the pre-translation unit 118 results for each particular segment.

Figure 2:
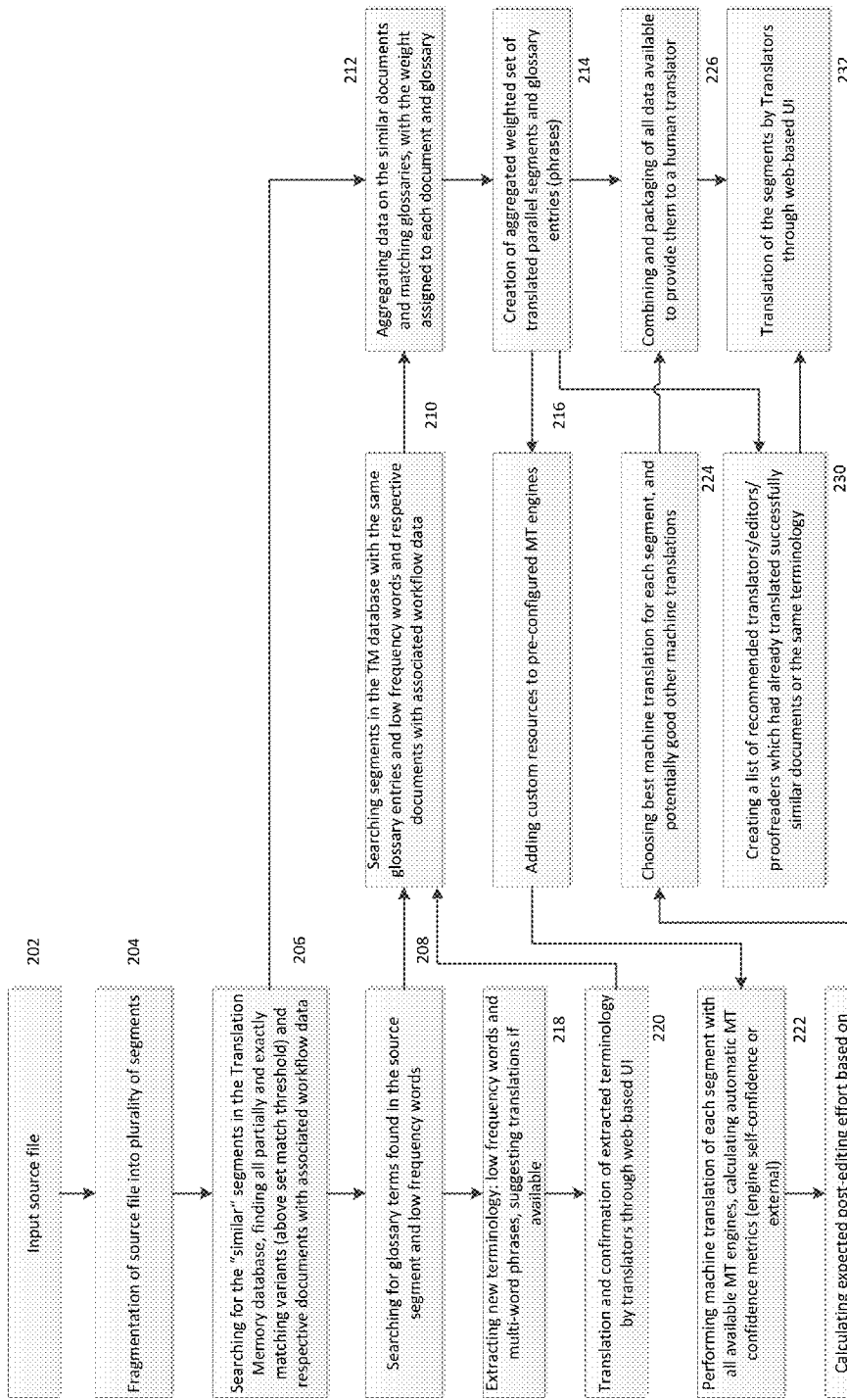
FIG. 2 shows a flow diagram illustrating a pre-translation method used in a translation unit 118 of a networked language translation system in accordance with an embodiment of the present invention.

FIG. 2 shows a flow diagram illustrating the pre-translation method used in a networked language translation system in accordance with an embodiment of the present invention. Starting from the block 202, a source file 104 is provided as an input by uploading the source file to the networked translation system. The source file 104 can either be in text or in binary; the source file 104 is then processed by the appropriate filter to convert the content into text form. In block 204, the text content of the source file 104 is then divided into segments based on the Segmentation Rule Exchange compatible parser. The segments are then saved in the database together with the specially processed source file 104.

The process of segmenting text into sentences may be done for example as follows: the cursor moves along the text, one character at a time. At each cursor position rules, consisting of a Before and After pattern, are applied in their given order to see if any of the Before patterns are valid for the text on the left and the corresponding After pattern for the text on the right of the cursor. If the rule matches, either the cursor moves on without inserting a segment break (for an exception rule) or a new segment break is created at the current cursor position (for a break rule).

In block 206, for each sentence segment saved in a database, the system searches for a partial match of previously translated sentences in Translation Memory 116, frequency dictionary and glossary terms available. For each exact or partial match found in the translation memory 116 associated document metadata and workflow data are also loaded from database. These data include MT engines used for pre-translation of this segment and string modifications metrics and time-based productivity metrics of human translator post-editing of this segment, and accounts of the translators/editor/proofreader which performed workflow operations for this particular segment.

Each translated (parallel) sentence segment added into the linguistic resources 116 translation memory index is first split into separate words and/or phrases, and is then searched against morphological frequency dictionaries containing all possible forms of the word, definitions of the basic form of the given word, other possible forms, and metadata associated with the particular word form found in the indexed sentence and this data for all the word and phrases found are then added to an index. A target part of the given parallel sentence segment is analyzed in the same way, and a word-by-word alignment is created based on the previously mentioned morphological dictionaries. For each word it is also performed a search in all customers and general glossaries available 208 and data on the glossary matches are added to the index, words which have a frequency (frequency is defined on a general language text corpus) lower than a pre-defined threshold are marked as low-frequency.

In block 206, a set of translation variants is selected by using a fuzzy match metric rule. While searching for previously translated sentences in the Translation Memory index a morphological analysis of the source sentence is performed, and different forms of the same word are considered to be the same word, but with a small penalty taking into account the fact that word forms are different. The much greater metric penalty is given for source segment words not found in the TM sentence or missing in the TM sentence words.

In block 208, a source text sentence is split into words and then each word is searched in the morphological dictionary to get its basic form and then in the frequency dictionary, so frequency metric is attached to each word. Source segment words which have a frequency metric (frequency is defined on a general language text corpus) lower than a pre-defined threshold are marked as low-frequency. Then each word is searched in all available customer and general glossaries, entries found are saved. If given word is a part of a multi-word glossary entry then the presence of other words in the source segment is checked, if they're present, this multi-word entry is also saved as a glossary match. For each word found in the morphological dictionary we also define possible parts of speech and assign them to each found word. Then, based on the terminology extraction rules and entire source document text we define candidate terms to be added to the project glossary. There're two sets of criteria for these candidate selection: linguistic and statistical. Linguistic criteria's are defined in a form of acceptable combinations rules and lists of stop words, not extracted as terms, e.g. we can define that a combination of two nouns can be a legitimate candidate term. Statistical criteria define a minimal number of candidate term entries in the source text, it can be set manually by the project manager and depends on the project phase, volume of already existing glossaries etc. Then a set of new candidate terms is defined and saved into the database inside block 218. Project managers can then assign a translator to review this extraction and add terms translation, translator reviews and translates extraction in block 220 through a web-based user interface 106. The translator can see reference terms translations from customer's translation memories if available, and from other glossaries and translation memories. Translated and reviewed additions to the project glossary is then transferred to the block 208 and is finally included into the aggregated datasets created in block 214.

As described in the section [028] during the addition of the translated (parallel) segments into translation memory 116, glossary entries found in the source and target sentences and low frequency words in the source sentence are identified and this information is attached to the index. In block 210 we look through the index created in the translation memory 116 for low frequency words and glossary entries found in the source segment, and thus we define a set of related segments with the same low frequency words and glossary terms. To each sentence included in the set we define a terminology match metric for machine translation:

$$MT\_terminology\_match_{i,j} = \frac{MT\_terminology\_index_{i,j}}{\max_{i,j}(MT\_terminology\_index)}$$

$$MT\_terminology\_index_i = \sum_{glossary\_entries_i} \frac{C_1 * words\_in\_entry}{1 + C_3 e^{-\frac{f_0}{f}}} + \sum_{low\_freq\_words_i} \frac{C_2}{1 + C_3 e^{-\frac{f_0}{f}}}$$

Where i denotes a source segment, j denotes a corresponding related segment, f—is a frequency of the respective word. Constants $C_1$, $C_2$, $C_3$, $f_0$ are chosen empirically for each language to provide the best possible correlation with human evaluation and automatic string metrics of machine translation engines trained on the texts filtered according to the $MT\_terminology\_match_{i,j}$ calculation algorithm. $MT\_terminology\_index_{i,j}$ is calculated according to the same formula as $MT\_terminology\_index_i$ but only words present in both sentences are taken into account, and set of the words present in both sentences is saved for all pairs of related sentences i and j. Words are considered matching is their basic forms match, which means that different morphological forms are considered as the same word and count as matching. $glossary\_entries_i$ and $glossary\_entries_j$ are count here as words found in the source text of the segment, it doesn't matter whether translation of the glossary entry in the target text of the parallel segment coincides with the glossary translation or not.

For each pair of related sentences we also calculate a general match metric, same as for translation memory matches.

For the purpose of selection of best applicable human translators/editors/proofreaders we define the following metrics of terminology matches:

$$Human\_terminology\_match_{i,j} = \frac{Human\_terminology\_index_{i,j}}{\max_{i,j}(Human\_terminology\_index)}$$

$$Human\_terminology\_index_i = \sum_{matching\_glossary\_entries_i} \frac{C_1 * words\_in\_entry}{1 + C_3 e^{-\frac{f_0}{f}}} + \sum_{low\_freq\_words_1} \frac{C_2}{1 + C_3 e^{-\frac{f_0}{f}}} + \sum_{different\_glossary\_entries_i} \frac{C_2 * words\_in\_entry}{1 + C_3 e^{-\frac{f_0}{f}}}$$

$$Human\_terminology\_match\_strict_{i,j} = \frac{Human\_terminology\_index\_strict_{i,j}}{\max_{i,j}(Human\_terminology\_index\_strict)}$$

$$Human\_terminology\_index\_strict_i = \sum_{matching\_glossary\_entries_i} \frac{C_1 * words\_in\_entry}{1 + C_3 e^{-\frac{f_0}{f}}} + \sum_{low\_freq\_words_i} \frac{C_2}{1 + C_3 e^{-\frac{f_0}{f}}}$$

Where $matching\_glossary\_entries_i$ are glossary entries found in the parallel segment for which translation in the segments target text is the same with the glossary. different_glossary_entries$_i$ are glossary entries found in the parallel segment for which translation in the segments target text is different to the glossary, glossary entries of that kind are added to the metric only when one of the conditions apply: glossary entry has more than one word or it is a low frequency word.

For each related segment from block 210 and fuzzy match translation memory segment from block 206 we define documents to which they belonged and workflow used for these documents: MT engines, human translators/editors/proofreaders, productivity of their work and string metrics of modifications made at each workflow stage. Data on translators/editors/proofreaders productivity are gathered real-time in the web-based user interface 106, interface collects, stores and then sends to the server all user actions, all keystrokes, mouse clicks and complex events such as entering into segment editing, leaving segment editing, substitution of text from translation memory, glossary or machine translation engine. Editing distance metrics are also calculated. Two types of metrics are used: pure string metrics comparing two strings (e.g. Levenshtein distance) and activity based metrics in which editor activities (keystrokes, mouse clicks and complex events) are also taken into account. Time spent on editing is also calculated taking into account data on inactivity periods when focus was lost, or inactivity period between to actions was greater than a pre-defined threshold.

Block 210 is repeated for every segment of the source text, thus we obtain a set of related segments in the translation memory database 116. One segment from the translation memory database 116 can be chosen as a related segment for a plurality of source text segments.

$$\text{MT\_terminology\_document\_match}_j = \max_i(\text{MT\_terminology\_match}_{i,j}) + \frac{\text{MT\_terminology\_match}_{0,j} + \ldots + \text{MT\_terminology\_match}_{N,j}}{N} \log N$$

Where MT_terminology_document_match$_j$ is a metric for the match of sentence j from the translation memory database 116, to a source document for translation, i—matching source text segments, with a positive value of MT_terminology_match$_{i,j}$ metric, N—number of distinct source text segments matching with the sentence j from the translation memory database 116.

And the same formula for Human_terminology_match$_j$ $$\text{Human\_terminology\_document\_match}_j = \max_i(\text{Human\_terminology\_match}_{i,j}) + \frac{\text{Human\_terminology\_match}_{0,j} + \ldots + \text{Human\_terminology\_match}_{N,j}}{N} \log N$$

In block 212 for each document in the translation memory database for which we found matching segments in blocks 210 and 206 we then define a document similarity metric.

$$\text{MT\_document\_similarity}_m = C_4 \sum_{related\_segments} \max_j(\text{MT\_terminology\_document\_match}_j) * \text{segment\_words}_j / \text{words\_total}_m + C_5 \sum_{TM\_matches} \text{TM\_match\_metric}_j * \text{segment\_words}_j / \text{words\_total}_m$$

$$\text{Human\_document\_similarity}_m = C_4 \sum_{related\_segments} \max_j(\text{Human\_terminology\_document\_match}_j) * \text{segment\_words}_j / \text{words\_total}_m + C_5 \sum_{TM\_matches} \text{TM\_match\_metric}_j * \text{segment\_words}_j / \text{words\_total}_m$$

Where TM_match_metric$_j$ is a fuzzy match percentage metric described above in section [029], normed to belong to a (0,1] range, m—document in a translation memory database, words_total$_m$—number of words in a document m. $C_4$, $C_5$—are empirically pre-defined constants.

For each document in the translation memory database 106 we can define glossaries explicitly assigned to this document by the customer or project manager. In block 214 we create four sets of linguistic resources for the source document:

(1) Explicitly assigned to the document by the customer or project manager glossaries and translation memories;
(2) Ordered set of resources for translation model customization:
  1. entries from explicitly assigned to the document glossaries;
  2. parallel segments from explicitly assigned to the document translation memories;
  3. for each document with MT_document_similarity$_m$ metric exceeding pre-defined threshold we add (documents are ordered according to their MT_document_similarity$_m$ metric, documents with the higher metric value come first):
    a. multiword entries from explicitly assigned to this document glossaries;
    b. parallel segments from this document;
    c. parallel segments from explicitly assigned to this document translation memories;
(3) Ordered set of resources for language model customization:
  1. parallel segments from explicitly assigned to the document translation memories;
  2. for each document with Human_document_similarity$_m$ metric exceeding pre-defined threshold we add (documents are ordered according to their Human_document_similarity$_m$ metric, documents with the higher metric value come first):
    a. parallel segments from this document;
    b. parallel segments from explicitly assigned to this document translation memories;
(4) Set of segments of the source document with the ordered data for each segment:
  1. fuzzy matching segments—only segments from the documents/translation memories present in the dataset (2) are included, segments are ordered according to the match percentage, segments with higher match percentage come first;
  2. related segments with the positive Human_terminology_match_strict$_{i,j}$ metric—only segments of the documents/translation memories present in the dataset (2) are included, segments are ordered according to the match percentage, segments with higher match percentage come first, for each parallel segment a word-by-word alignment of segment source text and its translation is also created and stored together with the segment;

In block 226 dataset (1) can be packaged for download and use in arbitrary external environment. Otherwise this data is stored in the database and shown for each respective segment to the translator/editor/proofreader through a web-based user interface 106.

In block 216 datasets (2) and (3) are added to the statistical and model based machine translation systems as a customization data. Data are added with a higher priority than general corpus and inside the dataset they're ordered in the same way as described above. Machine translation engines translation models and language models are then retrained if necessary, or custom models are trained.

In block 222 a draft machine translation is performed for each source text segment, which is processed by all available pre-defined machine translation engines. Each engine is customized in block 216 (if it's customizable) with the datasets (2) and (3) created in block 214. For each source text segment sent to each engine for translation we also add data from the dataset (4) created in block 214. Dataset (4) is used in the following way: we take each parallel segment from the fuzzy matching segments of dataset (4) and define sets of words (substrings) matching with a source segment, for each matching set of words we define its translation in the parallel segment based on the word-by-word alignment. Then we explore possible combinations of such substrings to get better coverage of source segment text, only substrings containing more than one word or low frequency words are considered. Thus we produce multiple options with translation from fuzzy matches.

Then we take related segments with the positive Human_terminology_match_strict$_{i,j}$ metric from the dataset (4) and extract from them, based on a word-by-word alignment of parallel segments, possible translations for low frequency words and glossary entries. Then for each translation option constructed as described above we look for these low frequency words and glossary entries not yet contained in any of the segment substrings with translation.

Thus, for each segment we define a set of options, each option contains a source segment text markup with a possible translation of some of its substrings. For each option we define a match percentage metric which defines part of the segment covered by substrings with translation.

These segment options are then sent to each of the machine translation engines available. For each input option each engine produces some translation and accompanying self-confidence metric, if available. For all machine translation engines we also calculate our own fluency metric (e.g. Perplexity-based) with a trained and customized in block 216 statistical machine translation language model. We then exclude machine translations with wrong terminology (terminology is verified against project glossaries). Then, for each machine translation engine we select a translation with the best self-confidence metric if it's available or our own fluency metric. Metric values are saved into the database together with the machine translations.

In an embodiment of the present invention, when a translator (or editor/proofreader) works on the sentence translation via the web page interface 106, all his activities inside this web page including keyboard strokes, mouse clicks, hot keys or user interface element usage are collected, send to the web server and stored in the database.

Based on this collected worker data, personal productivity and quality metrics are calculated asynchronously, e.g. time spent on the sentence translation (editing/correction), and amount of insignificant and significant (e.g. terminology) changes in the translation during the next workflow steps (e.g. changes done by editor after the translator). A manually defined quality metric can also be attached to the samples of each translated project or even each single document translated by a translator. These manual metrics are based on an error typology approach, when a Language Quality Assurance (LQA) specialist performs a thorough analysis of a small sample of the text and for each sentence records to the database mistakes found and their type and severity. Both types of metrics are used for assigning a reputation to each of the translators, proofreaders and editors.

For each segment which was a machine translation post-editing we calculate a number of the following events: (1) significant terminology change (rephrasing)—when one word is changed into another one, (2) words reordered, (3) words harmonization (change of the word endings, especially in languages with complex morphology, etc.). Then we calculate for each engine amounts of expected changes as a table function of the segment length and machine translation self-confidence and/or fluency statistical metric: Terminology_change (segment_words, MT_metric), Words_reordering(segment_words, MT_metric), Words_harmonization(segment_words, MT_metric).

For each translator we also have data on all segments she has post-edited, the amount of the changes of each type and total time spent on each segment post-editing. We can then calculate for each translator and each machine translation engine constants $t_1$, $t_2$, $t_3$, which provide best linear interpolation for the given worker data set:

Time_spent=$t_1$*Terminology_change(segment_words, MT_metric)+$t_2$*Words_reordering(segment_words,MT_metric)+$t_3$*Words_harmonization (segment_words,MT_metric), Based on the machine translation metrics calculated in block 222, segment length and table functions with expected amount of changes for each engine we define for each machine translation engine expected amount of human changes into each machine translation. Then we select machine translation with the best score, if multiple engines have similar scores we select translation with the highest percentage metric value defining part of the segment covered by substrings with translation from the translation memory. These data are then stored into the database and become available for packaging in block 226.

For each parallel segment included in the dataset (3) with a set of resources for language model customization, created in the block 214 we have a complete set of workflow data: translator (or machine translation post-editor), editor, corrector. We can also define documents containing these segments, manual Language Quality Assurance (LQA) metrics based on the error description in a sample of a text and automated metrics on the amount of different types of changes made by the editor and corrector (terminology change, words reordering, words harmonization), and time they have spent for every segment editing and correction. In block 230 we then calculate a weighted LQA metric for every translator/editor/proofreader participated in the translation workflow of the documents from the dataset (3):

$$LQA\_total = \frac{\sum Human\_document\_similarity_m * words\_total_m * LQA\_metric_m}{\sum Human\_document\_similarity_m * words\_total_m}$$

-continued $$\text{Weight\_total} = \sum \text{Human\_document\_similiarity}_m * \text{words\_total}_m$$

Where $\text{LQA\_metric}_m$ is a human LQA metric set to the document m.

Based on the LQA_total metric we exclude translators/editors/proofreaders with the metric value lower then empirically defined threshold. This threshold depends mostly on the project's quality requirements, defined by the project manager during project setup. Then we cluster the results of the LQA_total metrics for translators/editors/proofreaders and inside each cluster we sort results by Weight_total. Thus in block 230 we define a sorted list of preferred translators/editors/proofreaders for the given source document.

For each translator we also define an expected post-editing time and effort for the given source document. Post-editing time is calculated based on her sets of constants $t_1, t_2, t_3$ for each machine translation engine and selected in block 224 machine translations for each segment and these translations metrics.

Project manager reviews recommended for the project translators/editors/proofreaders, expected post-editing time and effort and project's statistics including translation memory matches, glossary matches, size and similarity metrics of the datasets created in block 214. Project manager gets data availability of the recommended translators/editors/proofreaders from the project management subsystem, makes a final decision and sends invitations to the project to the plurality of the selected responsible parties. This decision can also be made automatically based on the real-time availability status, projected workload of each person and project turnaround requirements.

After receiving an invitation translator/editor/proofreader confirms or declines her participation in the project. After the confirmation, responsible person in block 232 can sign in into her web-based user interface 106 and start working on the project. There are two kinds of projects: sequential, when the next workflow stage starts only after completion of the project's previous stage, and parallel when workflow stages are defined at a segment level, i.e. next workflow stage can be performed on the segment right after it passed through the previous stage.

When the document passes through all the necessary workflow stages and the translation is finalized it goes to the block 128 where the translated document is generated. Translated document 130 has the same file format (text or binary) as the source file. Translated document is generated with the segments final translations and source file metadata produced by the segmentation module 114 during the initial source file processing stage.

Translated document 130 is then delivered to the client through a web-based user interface. Customer downloads the file. If files are stored in some external information system, then translated file is delivered into this system through a web API call from the integration layer 302.

Figure 3:
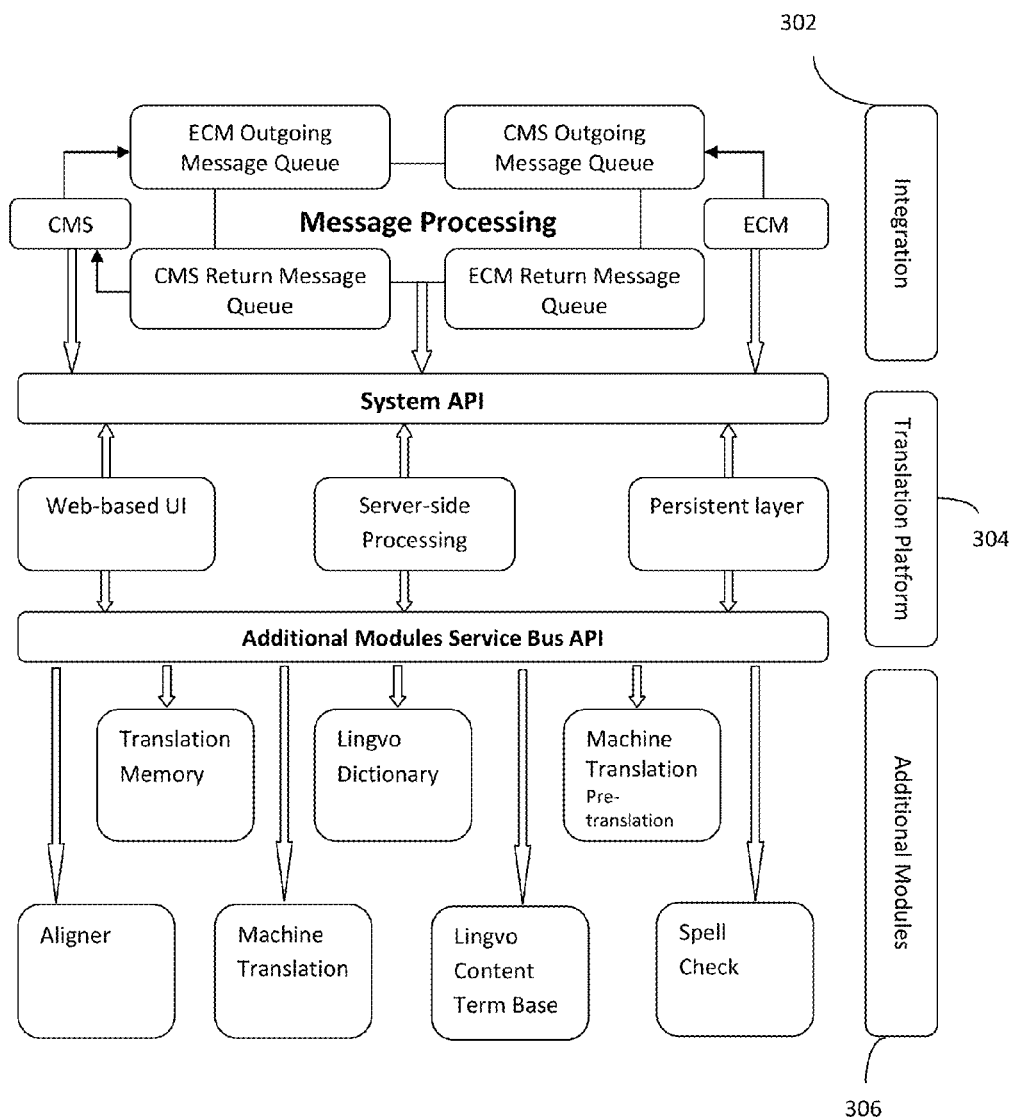
FIG. 3 is a schematic illustration of a platform with integration layer used in a networked language translation system in accordance with an embodiment of the present invention.

FIG. 3 is a schematic illustration of a platform used in a networked language translation system in accordance with an embodiment of the present invention. Referring to FIG. 3, the platform includes three layers: integration layer 302, translation platform 304 and additional modules 306. The integration layer 302 facilitates the uploading of source file 102 and the converting of source files into text form. The integration layer 302 is present in the platform if the information system such as a content management system, document management system, or portals are used as a source of files for translation. The translation platform layer 304 includes a web-based user interface, server side processing and a persistent layer. The web-based user interface provides an interface for users, translators, managers, editors, proofreaders, terminologists and other users. The web-based user interface comprises a separate window for translation project management and translator's working interface for parallel text editing. The server side processing involves the documents conversion and validation. The additional module service layer 306 includes a translation memory wherein fuzzy matches are found, a ABBYY Lingvo™ dictionary or other dictionary, a machine translator for post-editing, an aligner that converts the external document into XML format and a spell check unit. Other subsystems can also be integrated, if necessary, through an integration API service bus.

We claim:

1. A system comprising:
   at least one memory, in a networked language translation system, to store linguistic resources for one or more translation models comprising a translation memory database, at least one morphological dictionary, and at least one glossary, wherein the translation memory database stores a plurality of parallel phrases in at least one first language and at least one second language, wherein the glossary stores glossary terms that each comprise one or more words in the first language, wherein the morphological dictionary stores possible forms for each of a plurality of words in the first language, and wherein each of the possible forms has a basic form;
   an interface, in the networked language translation system, to receive a source document in the first language to be translated to the second language;
   at least one hardware processing unit, in the networked language translation system, configured to:
   segment the source document into a plurality of initial segments in the first language;
   match one or more of the initial segments in the first language with one or more of the parallel phrases in the first language from the translation memory database to identify one or more of the parallel phrases in the second language from the translation memory database;
   generate at least one machine translation of the initial segments based on the translation models and the identified ones of the parallel phrases in the second language, wherein the machine translation comprises a plurality of pre-translation segments corresponding to ones of the initial segments;
   generate similarity scores for the pre-translation segments, wherein each similarity score in the similarity scores corresponds to a pre-translation segment in the pre-translation segments and measures a similarity between a corresponding one of the initial segments in the first language and a corresponding one of the parallel phrases in the first language;
   determine for each pre-translation segment in the pre-translation segments whether human translation is required for the pre-translation segment based on the similarity score of the pre-translation segment;
   in response to a determination that a set of one or more of the pre-translation segments require human translation, select multiple human translators from a plurality of human translators based on preference scores for the plurality of human translators, wherein each preference score among the preference scores is based on qualities of translations for documents previously translated by a human translator among the plurality of human translators that are similar to the source document;

provide a set of one or more of the initial segments in the first language and the set of the pre-translation segments in the second language to translator systems over a network for translation of the set of the initial segments by the multiple human translators;

receive one or more translated segments in the second language from the translator systems over the network, wherein the translated segments correspond to the set of the pre-translation segments;

assemble the translated segments and ones of the pre-translation segments to generate a translation of the source document in the second language; and retrain one or more of the language models based on the translated segments.

2. The system of claim 1, wherein the source document is a text file or binary file.

3. The system of claim 1, wherein the preference score is obtained by recording errors and severity of mistakes in a text translated by the human translator or in text post-edited by the human translator after a machine translation.

4. The system of claim 1, wherein each initial segment in the ones of the initial segments matched to a parallel phrase in the parallel phrases are matched using lexical, morphological, and syntactic analysis of the initial segments and the parallel phrases based on a match of a first possible form among the possible forms with the initial segment, a match of a second possible form among the possible forms with the parallel phrase in the first language, and a match of the basic form for the first possible form with the basic form for the second possible form, and wherein the similarity score of the pre-translation segment is reduced in response to a determination that the first possible form is different than the second possible form.

5. The system of claim 1, wherein the hardware processing unit is further to provide real time translations of the set of the pre-translation segments to a human translator among the multiple human translators that are received from others of the multiple human translators.

6. The system of claim 1, wherein the initial segments are matched to the parallel phrases on the basis of fuzzy strings similarity calculation logic and take into account different morphological forms of the same words.

7. A method comprising:

storing, in at least one memory in a networked language translation system, linguistic resources for one or more translation models comprising a translation memory database, at least one morphological dictionary, and at least one glossary, wherein the translation memory database stores a plurality of parallel phrases in at least one first language and at least one second language, wherein the glossary stores glossary terms that each comprise one or more words in the first language, wherein the morphological dictionary stores possible forms for each of a plurality of words in the first language, and wherein each of the possible forms has a basic form;

receiving, by an interface in the networked language translation system, a source document in the first language to be translated to the second language;

segmenting, by at least one hardware processing unit in the networked language translation system, the source document into a plurality of initial segments in the first language;

matching, by the hardware processing unit, one or more of the initial segments in the first language with one or more of the parallel phrases in the first language from the translation memory database to identify one or more of the parallel phrases in the second language from the translation memory database;

generating, by the hardware processing unit, at least one machine translation of the initial segments based on the translation models and the identified ones of the parallel phrases in the second language, wherein the machine translation comprises a plurality of pre-translation segments corresponding to ones of the initial segments;

generating, by the hardware processing unit, similarity scores for the pre-translation segments, wherein each similarity score in the similarity scores corresponds to a pre-translation segment in the pre-translation segments and measures a similarity between a corresponding one of the initial segments in the first language and a corresponding one of the parallel phrases in the first language;

determining, by the hardware processing unit, for each pre-translation segment in the pre-translation segments whether human translation is required for the pre-translation segment based on the similarity score of the pre-translation segment;

in response to determining that a set of one or more of the pre-translation segments require human translation, selecting, by the hardware processing unit, multiple human translators from a plurality of human translators based on preference scores for the plurality of human translators, wherein each preference score among the preference scores is based on qualities of translations for documents previously translated by a human translator among the plurality of human translators that are similar to the source document;

providing, by the hardware processing unit, a set of one or more of the initial segments in the first language and the set of the pre-translation segments in the second language to translator systems over a network for translation of the set of the initial segments by the multiple human translators;

receiving, by the hardware processing unit, one or more translated segments in the second language from the translator systems over the network, wherein the translated segments correspond to the set of the pre-translation segments;

assembling, by the hardware processing unit, the translated segments and ones of the pre-translation segments to generate a translation of the source document in the second language; and retraining, by the hardware processing unit, one or more of the language models based on the translated segments.

8. The method of claim 7, wherein the source document is a text file or binary file.

9. The method of claim 7, wherein the preference score is obtained by recording errors and severity of mistakes in a text translated by the human translator or in text post-edited by the human translator after a machine translation.

10. The method of claim 7, wherein each initial segment in the ones of the initial segments matched to a parallel phrase in the parallel phrases are matched using lexical, morphological, and syntactic analysis of the initial segments and the parallel phrases based on a match of a first possible form among the possible forms with the initial segment, a match of a second possible form among the possible forms with the parallel phrase in the first language, and a match of the basic form for the first possible form with the basic form for the second possible form, and wherein the similarity score of the pre-translation segment is reduced in response to determining that the first possible form is different than the second possible form.

11. The method of claim 7, further comprising providing real time translations of the set of the pre-translation segments to a human translator among the multiple human translators that are received from others of the multiple human translators.

12. The method of claim 7, wherein the initial segments are matched to the parallel phrases on the basis of fuzzy strings similarity calculation logic and take into account different morphological forms of the same words.

13. A non-transitory memory having stored therein computer executable code that, when executed by at least one hardware processing unit, causes the hardware processing unit to:
store, in at least one memory in a networked language translation system, linguistic resources for one or more translation models comprising a translation memory database, at least one morphological dictionary, and at least one glossary, wherein the linguistic resources comprise translation memory database stores a plurality of parallel phrases in at least one first language and at least one second language, wherein the glossary stores glossary terms that each comprise one or more words in the first language, wherein the morphological dictionary stores possible forms for each of a plurality of words in the first language, and wherein each of the possible forms has a basic form;
receive, by an interface in the networked language translation system, a source document in the first language to be translated to the second language;
segment, by the hardware processing unit in the networked language translation system, the source document into a plurality of initial segments in the first language;
match, by the hardware processing unit, one or more of the initial segments in the first language with one or more of the parallel phrases in the first language from the translation memory database to identify one or more of the parallel phrases in the second language from the translation memory database;
generate, by the hardware processing unit, at least one machine translation of the initial segments based on the translation models and the identified ones of the parallel phrases in the second language, wherein the machine translation comprises a plurality of pre-translation segments corresponding to ones of the initial segments;
generate, by the hardware processing unit, similarity scores for the pre-translation segments, wherein each similarity score in the similarity scores corresponds to a pre-translation segment in the pre-translation segments and measures a similarity between a corresponding one of the initial segments in the first language and a corresponding one of the parallel phrases in the first language;
determine, by the hardware processing unit, for each pre-translation segment in the pre-translation segments whether human translation is required for the pre-translation segment based on the similarity score of the pre-translation segment;
in response to a determination that a set of one or more of the pre-translation segments require human translation, select, by the hardware processing unit, multiple human translators from a plurality of human translators based on preference scores for the plurality of human translators, wherein each preference score among the preference scores is based on qualities of translations for documents previously translated by a human translator among the plurality of human translators that are similar to the source document;
provide, by the hardware processing unit, a set of one or more of the initial segments in the first language and the set of the pre-translation segments in the second language to translator systems over a network for translation of the set of the initial segments by the multiple human translators;
receive, by the hardware processing unit, one or more translated segments in the second language from the translator systems over the network, wherein the translated segments correspond to the set of the pre-translation segments;
assemble, by the hardware processing unit, the translated segments and ones of the pre-translation segments to generate a translation of the source document in the second language; and
retrain, by the hardware processing unit, one or more of the language models based on the translated segments.

14. The non-transitory memory of claim 13, wherein the source document is a text file or binary file.

15. The non-transitory memory of claim 13, wherein the preference score is obtained by recording errors and severity of mistakes in a text translated by the human translator or in text post-edited by the human translator after a machine translation.

16. The non-transitory memory of claim 13, wherein each initial segment in the ones of the initial segments matched to a parallel phrase in the parallel phrases are matched using lexical, morphological, and syntactic analysis of the initial segments and the parallel phrases based on a match of a first possible form among the possible forms with the initial segment, a match of a second possible form among the possible forms with the parallel phrase in the first language, and a match of the basic form for the first possible form with the basic form for the second possible form, and wherein the similarity score of the pre-translation segment is reduced in response to a determination that the first possible form is different than the second possible form.

17. The non-transitory memory of claim 13, wherein the computer executable code is further to cause the hardware processing unit to provide real time translations of the set of the pre-translation segments to a human translator among the multiple human translators that are received from others of the multiple human translators.

18. The non-transitory memory of claim 13, wherein the initial segments are matched to the parallel phrases on the basis of fuzzy strings similarity calculation logic and take into account different morphological forms of the same words.

* * * * *